United States Patent
Morimoto

(10) Patent No.: US 10,055,176 B2
(45) Date of Patent: Aug. 21, 2018

(54) CONTROL METHOD AND NON-TRANSITORY COMPUTER-READABLE RECORDING MEDIUM

(71) Applicant: CANON KABUSHIKI KAISHA, Tokyo (JP)

(72) Inventor: Hiroaki Morimoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/442,533

(22) Filed: Feb. 24, 2017

(65) Prior Publication Data
US 2017/0249111 A1    Aug. 31, 2017

(30) Foreign Application Priority Data
Feb. 29, 2016    (JP) ................ 2016-038346

(51) Int. Cl.
*G06F 3/12*    (2006.01)

(52) U.S. Cl.
CPC ........... *G06F 3/1213* (2013.01); *G06F 3/126* (2013.01); *G06F 3/1207* (2013.01); *G06F 3/1227* (2013.01); *G06F 3/1259* (2013.01); *G06F 3/1267* (2013.01); *G06F 3/1274* (2013.01); *G06F 3/1276* (2013.01); *G06F 3/1284* (2013.01)

(58) Field of Classification Search
None
See application file for complete search history.

(56) References Cited

U.S. PATENT DOCUMENTS

| | | | | |
|---|---|---|---|---|
| 7,707,325 B2* | 4/2010 | Kawasaki | ............. | G06F 3/1207 358/426.02 |
| 8,643,870 B2* | 2/2014 | Kurihara | ............... | G06F 3/1207 358/1.15 |
| 2007/0035763 A1* | 2/2007 | Bard | ..................... | G06F 3/1222 358/1.15 |
| 2010/0182643 A1* | 7/2010 | Ito | ......................... | G06F 3/1203 358/1.15 |
| 2014/0192376 A1* | 7/2014 | Morimoto | ............... | G06F 3/121 358/1.13 |
| 2015/0294198 A1* | 10/2015 | Okazawa | .............. | G06F 3/1206 358/1.15 |
| 2016/0274845 A1* | 9/2016 | Wakasa | ................. | G06F 3/1254 |

FOREIGN PATENT DOCUMENTS

| | | | |
|---|---|---|---|
| JP | 200711469 A | | 1/2007 |
| JP | 2007328574 | * | 12/2007 |
| JP | 2007328574 A | * | 12/2007 |
| JP | 2013206324 A | * | 10/2013 |
| JP | 2016015032 A | * | 1/2016 |

* cited by examiner

*Primary Examiner* — Fan Zhang
(74) *Attorney, Agent, or Firm* — Canon U.S.A., Inc. IP Division

(57) ABSTRACT

There are provided an information processing apparatus and a control method which realize job holding processing while reducing time taken to complete transmission of a job. The control method includes not notifying a spooler of deletion of the job from a job queue after the spooler specifies that transmission of all of pieces of data corresponding to the job is completed and in a case where processing of the job is not completed by a communication apparatus.

17 Claims, 14 Drawing Sheets

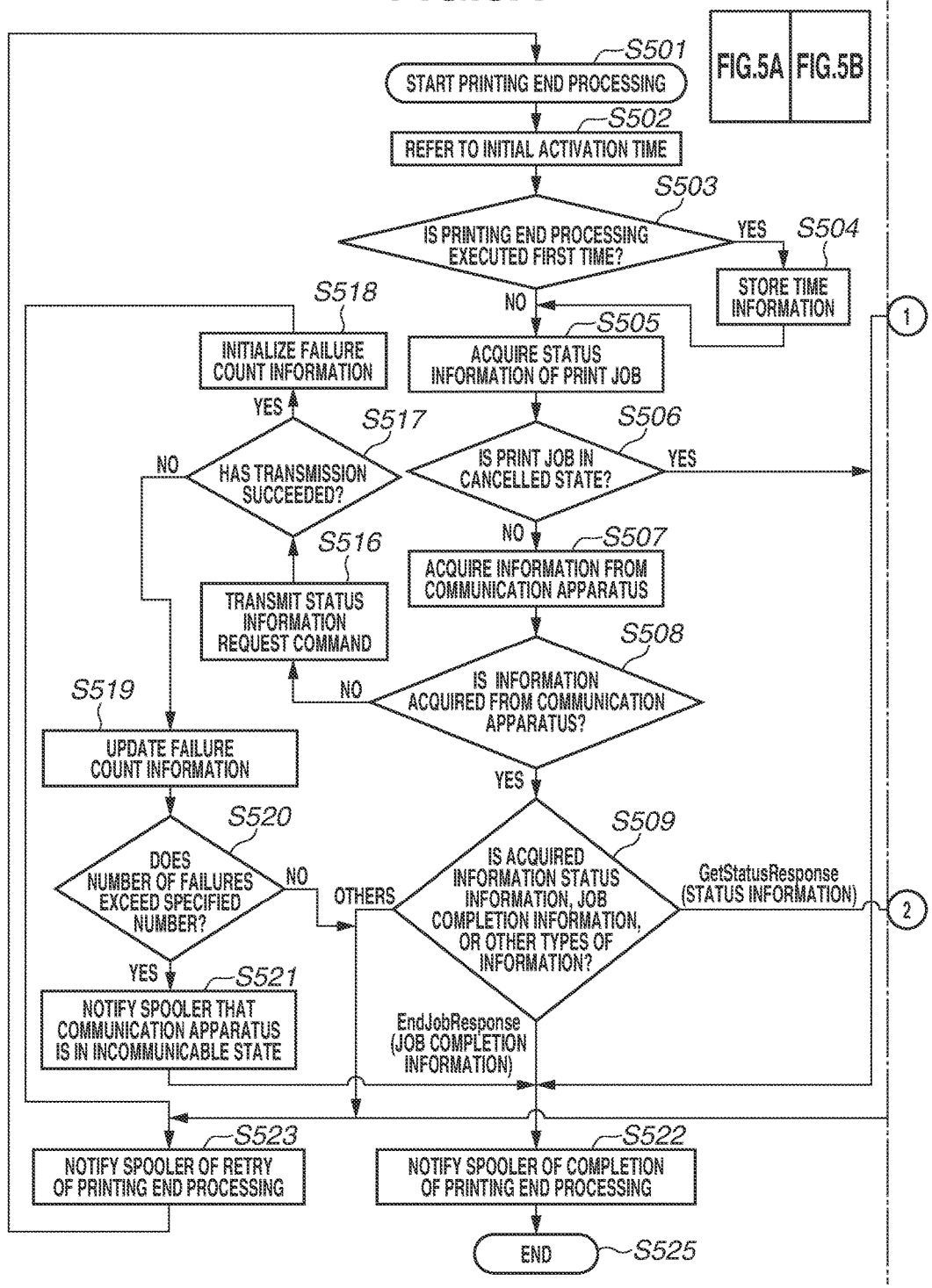

FIG.7

IDENTIFICATION INFORMATION: 12345678-ABCD-1234-EFGH-123456789012

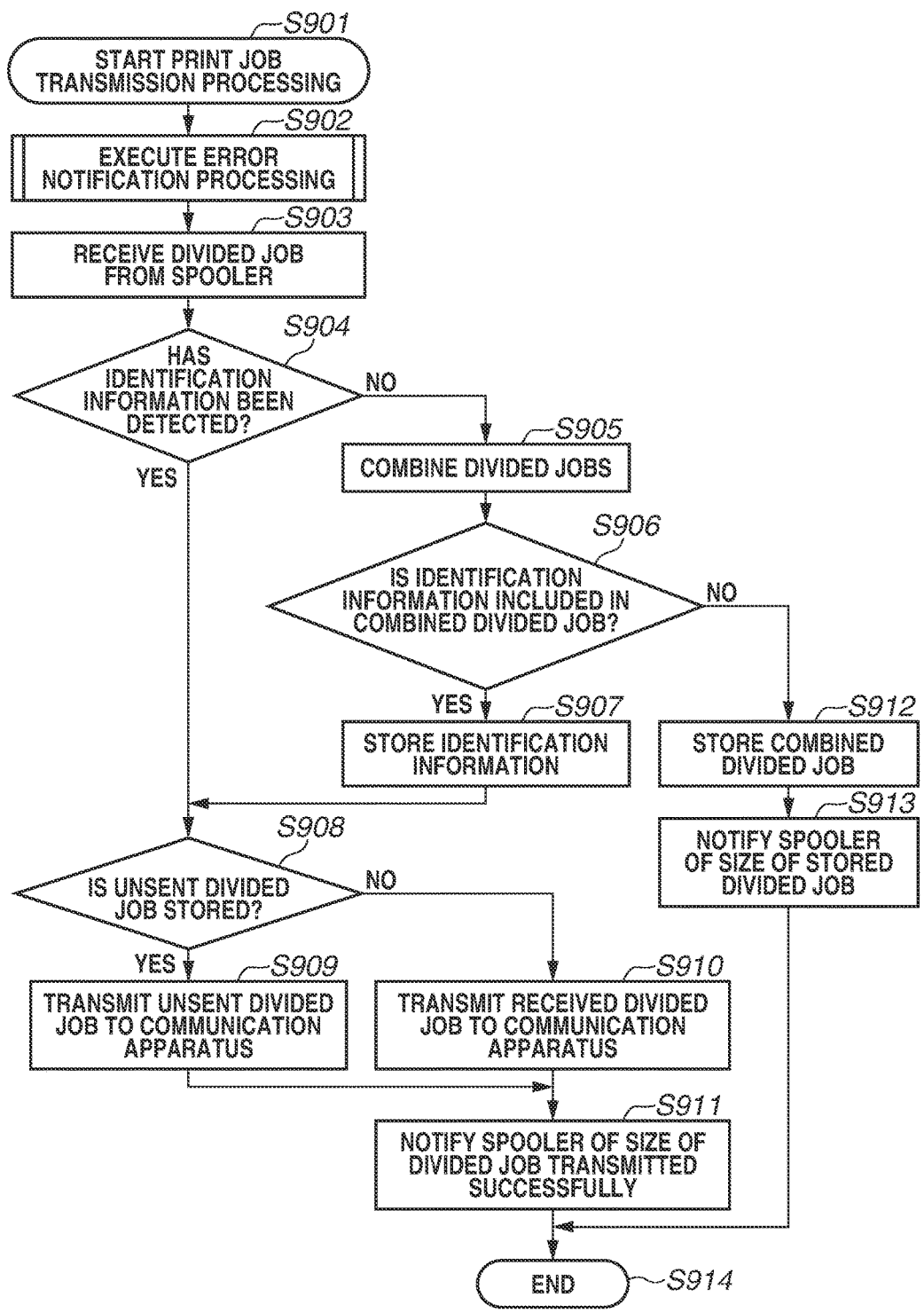

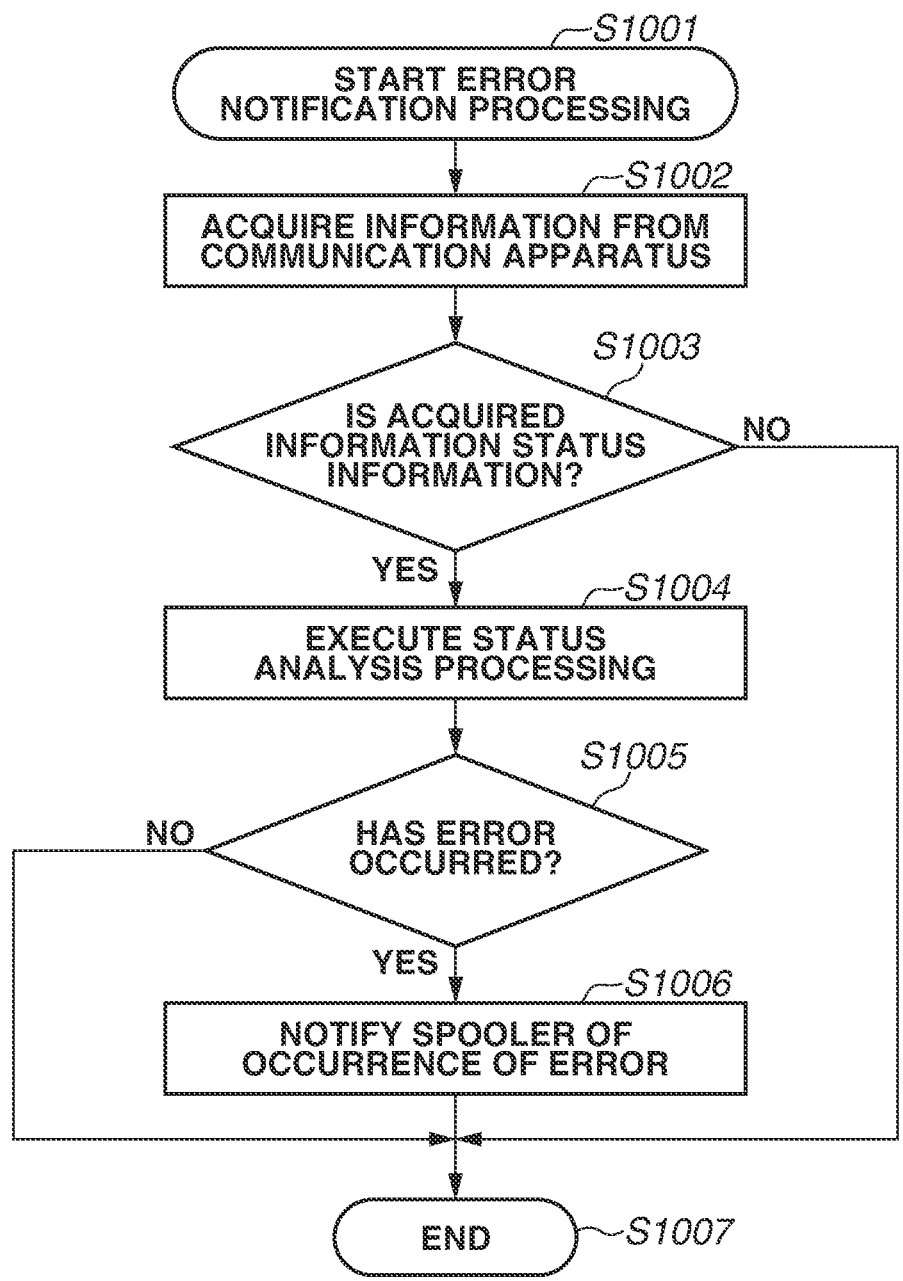

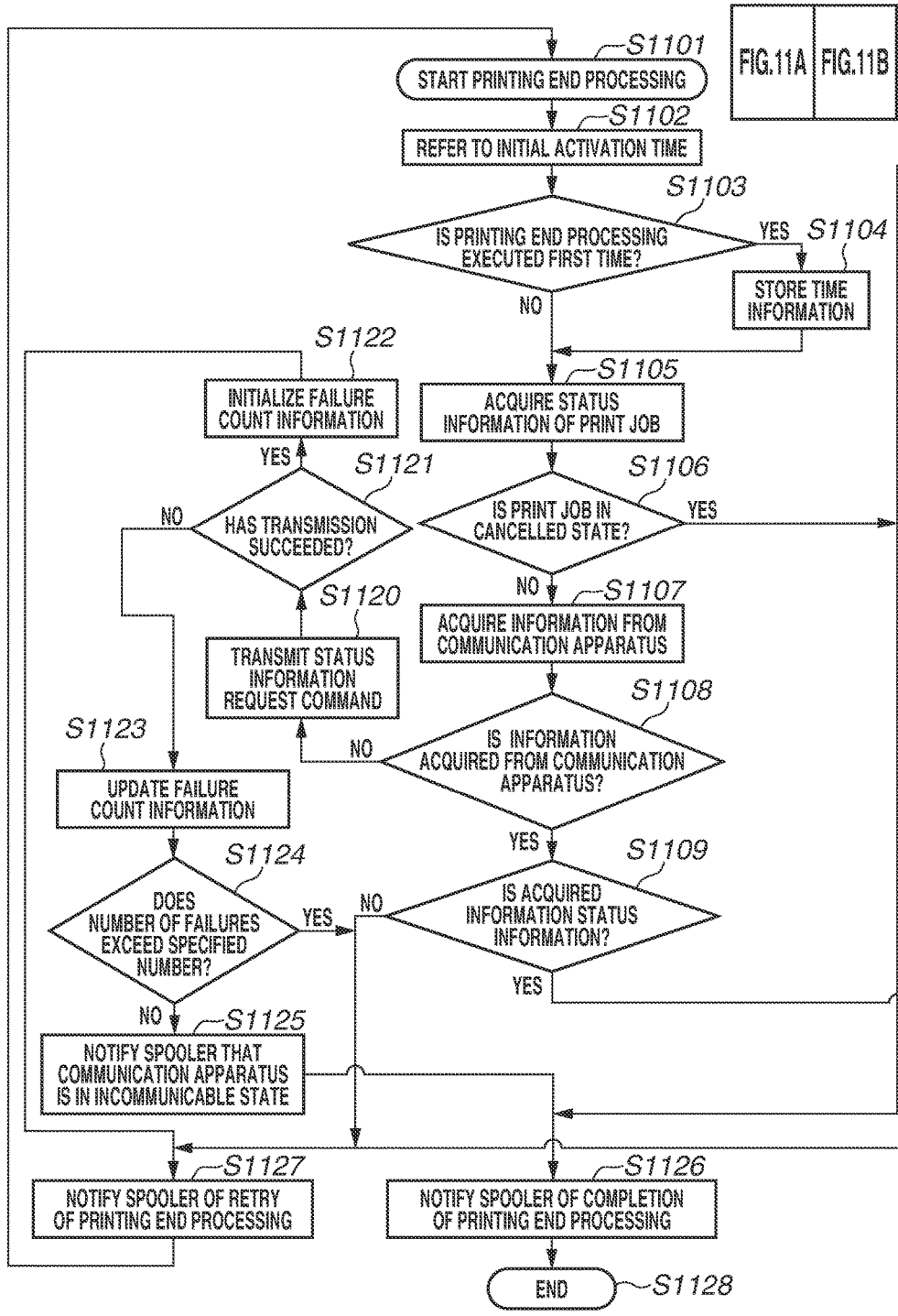

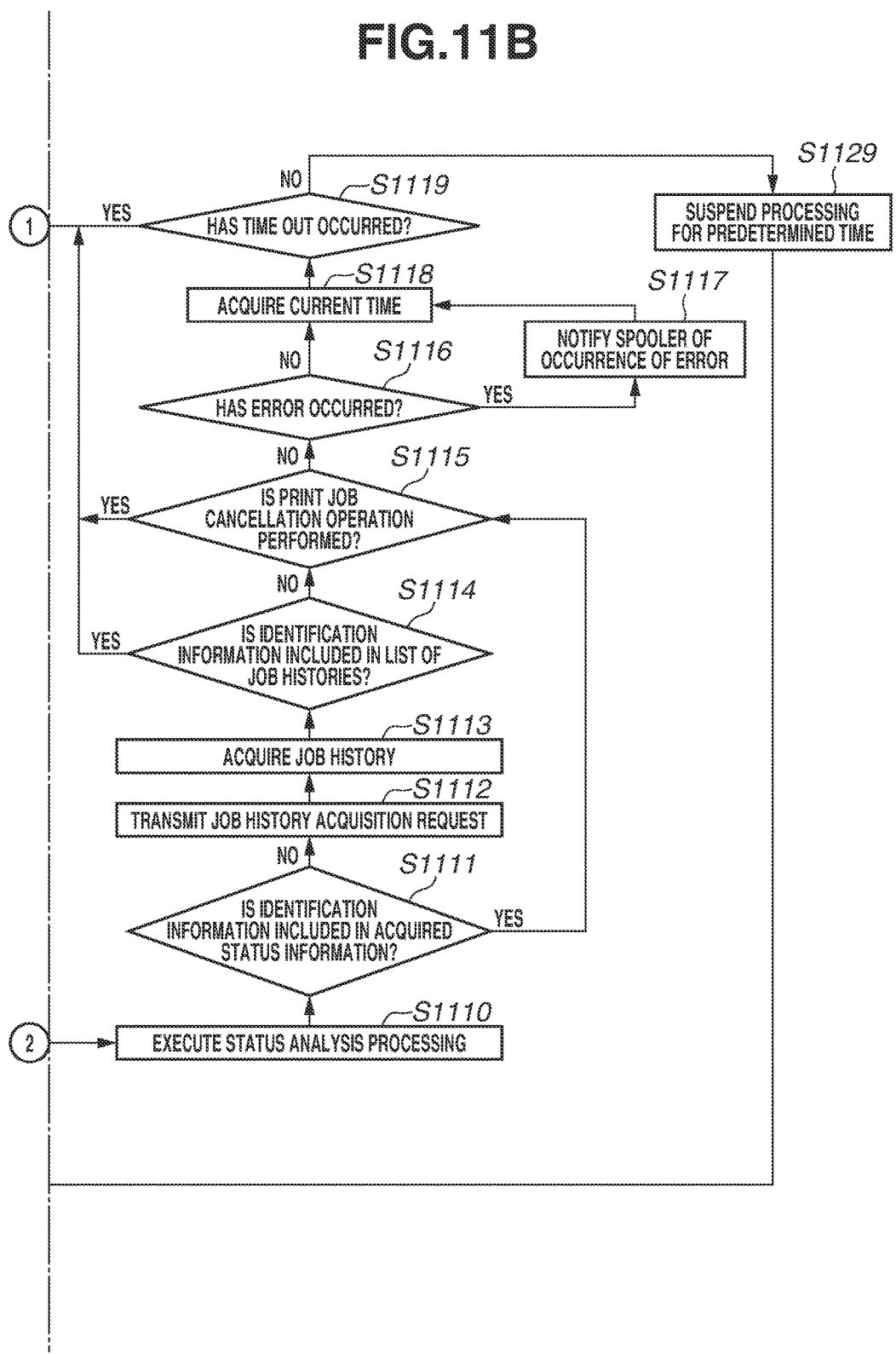

FIG.12

```xml
<?xml version="1.0" encoding="utf-8" ?>
<contents>
    <operation>JobLog</operation>
    <log id="aaaa-bbbb-cccc-dddd">
        <result>success</result>
    </log>
    <log id="1111-2222-3333-4444">
        <result>success</result>
    </log>
    <log id="aaaa-1111-bcbc-1010">
        <result>cancel</result>
    </log>
</contents>
```

CONTROL METHOD AND NON-TRANSITORY COMPUTER-READABLE RECORDING MEDIUM

BACKGROUND

Field of the Disclosure

The present disclosure relates to a control method and a non-transitory computer-readable recording medium.

Description of the Related Art

There is known a communication system configured of a communication apparatus such as a printer capable of processing a job and an information processing apparatus such as a personal computer (hereinbelow, referred to as "PC") capable of transmitting a job. In such a communication system, the information processing apparatus can recognize a status of the job stored in a job queue included in the information processing apparatus until the job is deleted from the job queue.

Japanese Patent Application Laid-Open No. 2007-11469 discusses a technique that enables an information processing apparatus to recognize a status of a job until processing of the job is completed by a communication apparatus by executing processing (hereinbelow, "job holding processing") for continuously holding the job in a job queue until the processing of the job is completed by the communication apparatus.

As described above, through the technique described in Japanese Patent Application Laid-Open No. 2007-11469, the information processing apparatus can recognize the status of the job until processing of the job is completed by the communication apparatus by realizing the job holding processing. On the other hand, in realization of the job holding processing, there is a demand for further reducing the time taken to complete transmission of the job. As such, there is a need of a method capable of realizing the job holding processing while reducing the time taken to complete transmission of the job.

SUMMARY

According to an aspect of the present disclosure, a control method for controlling an information processing apparatus including a printer driver for creating a job based on a printing command received from an application and a spooler for managing a job queue that stores the job, includes transmitting data corresponding to the job to a communication apparatus without analyzing whether data of a transmission target is data to be transmitted last from among a plurality of pieces of data corresponding to the job, acquiring information about the job from the communication apparatus in a case where a job corresponding to the transmitted data is stored in the job queue, and notifying a spooler of deletion of the job from the job queue after the spooler specifies that transmission of all of the pieces of data corresponding to the job is completed and in a vase where processing of the job is ended by the communication apparatus, and not notifying the spooler of deletion of the job from the job queue after the spooler specifies that transmission of all of the pieces of data corresponding to the job is completed and in a case where processing of the job is not ended by the communication apparatus.

According to another aspect of the present disclosure, a control method for controlling an information processing apparatus including a printer driver for creating a job based on a printing command received from an application and a job queue for storing the job, includes executing initialization processing for transmitting the job, transmitting a plurality of pieces of data acquired by dividing the job to a communication apparatus in a case where the initialization processing is ended, executing end processing for deleting the job from the job queue in a case where transmission of the plurality of pieces of data is completed, and acquiring information about the job from the communication apparatus in a case where a job corresponding to the transmitted plurality of pieces of data is stored in the job queue, wherein the end processing is ended in a case where processing of the job is completed by the communication apparatus, and the end processing is retried in a case where processing of the job is not completed by the communication apparatus, and wherein the job is deleted from the job queue in a case where the end processing is ended.

Further features of the present disclosure will become apparent from the following description of exemplary embodiments with reference to the attached drawings.

BRIEF DESCRIPTION OF THE DRAWINGS

FIG. 7 is a diagram illustrating an example of identification information attached to print data according to one or more aspects of the present disclosure.

FIG. 9 is a flowchart illustrating print job transmission processing according to one or more aspects of the present disclosure.

FIG. 10 is a flowchart illustrating error notification processing according to one or more aspects of the present disclosure.

FIG. 11 (consisting of FIGS. 11A and 11B) is a flowchart illustrating printing end processing according to one or more aspects of the present disclosure.

FIG. 12 is a diagram illustrating an example of information indicating a list of processed print jobs according to one or more aspects of the present disclosure.

DESCRIPTION OF THE EMBODIMENTS

Hereinbelow, exemplary embodiments of the present disclosure will be described in detail with reference to the appended drawings. Further, the exemplary embodiments described below are not intended to limit the content of the disclosure described in the claims, and not all of the combinations of features described in the exemplary embodiments are required as the solutions of the present disclosure.

A first exemplary embodiment of a communication apparatus to which the present disclosure is applied will be described. The communication apparatus can receive a job from an information processing apparatus. In the present exemplary embodiment, an ink jet multifunction peripheral (MFP) will be described as an example of the communication apparatus. The MFP has a plurality of functions such as printing, scanning, copying, and facsimile transmission. In addition, for example, the communication apparatus may be a copying machine, a facsimile apparatus, a scanner, a personal computer (PC), a smartphone, a tablet terminal, a personal digital assistant (PDA), a digital camera, or a music reproduction device. Further, for example, when the communication apparatus is a printer, an electro-photographic method may be also employed as a printing method in addition to the ink jet method. Furthermore, the communication apparatus may be a single function peripheral (SFP) instead of the MFP. The information processing apparatus can transmit a job to the communication apparatus. In the present exemplary embodiment, a mobile terminal will be described as an example of the information processing apparatus. In addition, for example, the information processing apparatus may be a PC, a smartphone, a tablet terminal, a PDA, or a camera. Further, although a print job for causing the communication apparatus to execute printing will be described as an example of the job handled by the information processing apparatus and the communication apparatus, it is not limited thereto, and the job may be a scan job for causing the communication apparatus to execute scanning.

Figure 1:
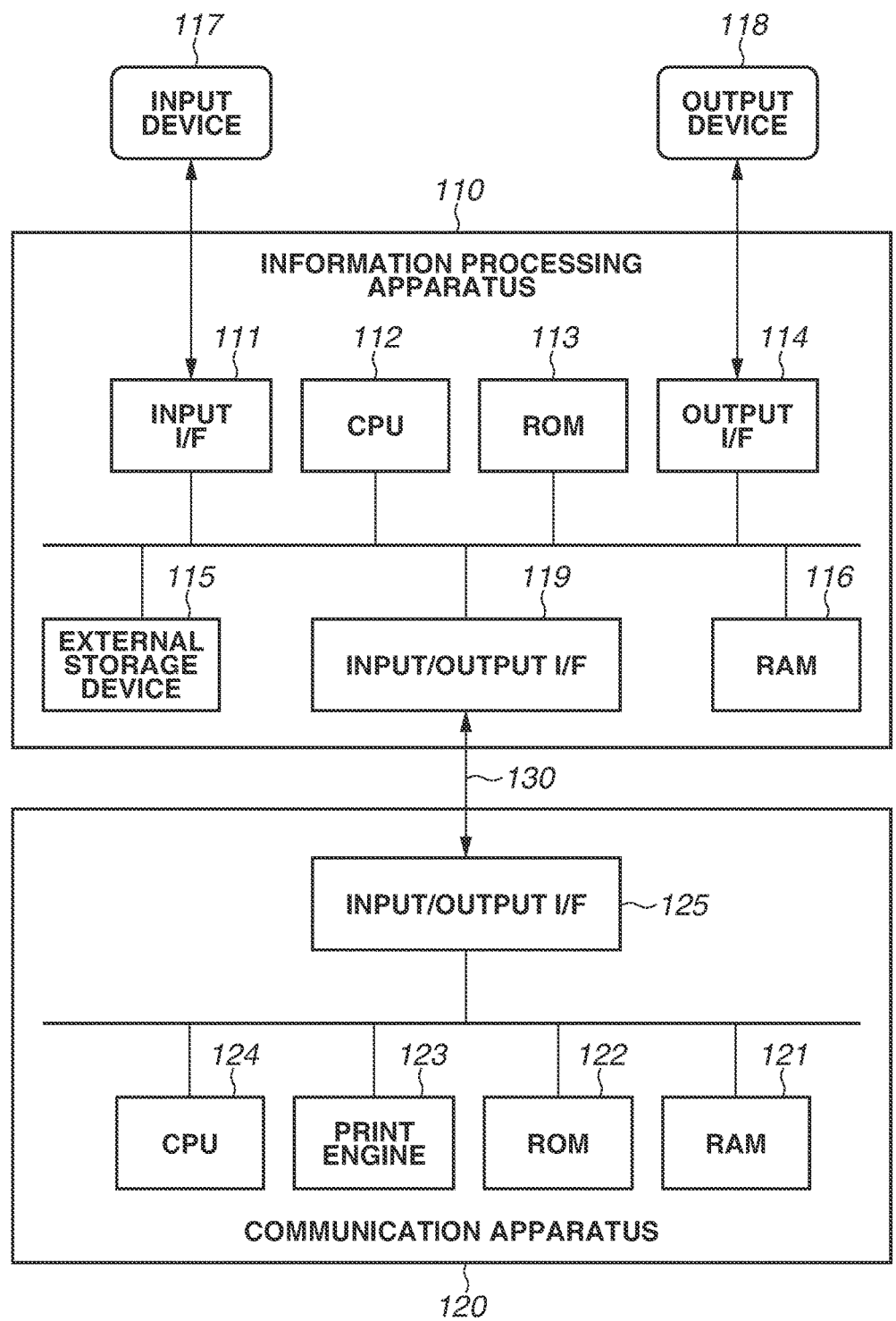
FIG. 1 is a block diagram illustrating a printing system including a communication apparatus and an information processing apparatus according to one or more aspects of the present disclosure.

FIG. 1 is a block diagram illustrating an example of an entire configuration of the communication system including an information processing apparatus 110 and a communication apparatus 120 connected thereto. The information processing apparatus 110 includes an input interface (I/F) 111, a central processing unit (CPU) 112, a read only memory (ROM) 113, an output I/F 114, an external storage device 115, a random access memory (RAM) 116, an input device 117, an output device (display unit) 118, and an input/output I/F 119. The CPU 112 controls the information processing apparatus 110 according to a control command stored in the ROM 113. The ROM 113 stores an initialization program, whereas the external storage device 115 stores a control program, an embedded operating system (hereinbelow, referred to as "OS"), and a printer driver that are executed by the CPU 112, and various types of data. In the present exemplary embodiment, the control program stored in the external storage device 115 causes the CPU 112 to execute software control such as scheduling and task switching under the management of the embedded OS stored in the external storage device 115. The RAM 116 is used as a work memory for various programs stored in the external storage device 115. The input device 117 is connected to the input I/F 111 and used for inputting data or instructing an operation. The output device 118 is connected to the output I/F 114 and used for a data display and a status notification.

The communication apparatus 120 includes a RAM 121, a ROM 122, a print engine 123, a CPU 124, and an input/output I/F 125. The information processing apparatus 110 and the communication apparatus 120 are connected to each other through a universal serial bus (USB) (trademark) cable 130. The RAM 121 is used as a work memory for the CPU 124, and used also as a buffer for temporarily storing received data. The ROM 122 stores a control command. The print engine 123 executes printing based on the data stored in the RAM 121. The CPU 124 controls the communication apparatus 120 according to the control command stored in the ROM 122. In the present exemplary embodiment, although sharing of the processing executed by the information processing apparatus 110 and the communication apparatus 120 has been described as described above, the sharing thereof is not limited thereto.

Figure 2:
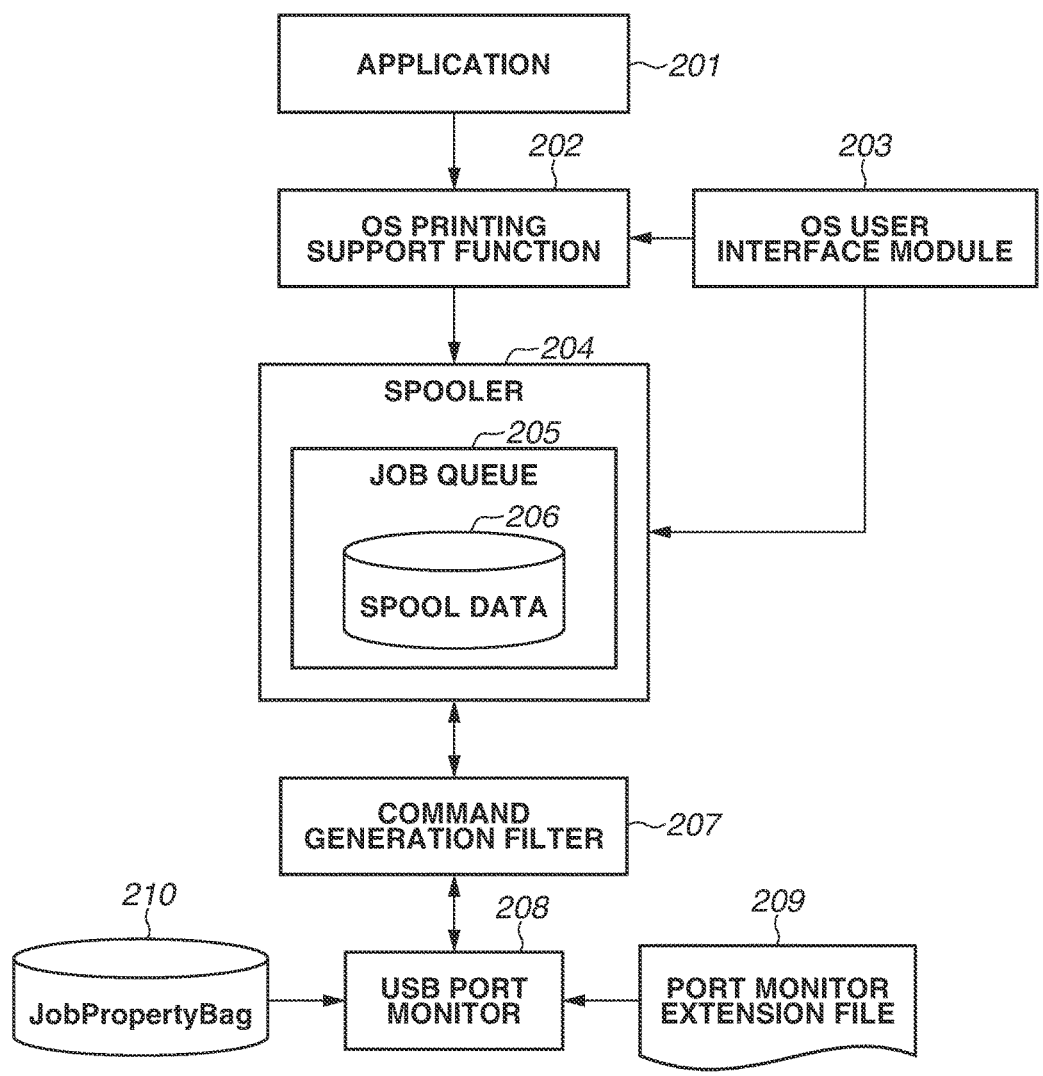
FIG. 2 is a block diagram illustrating a configuration of software included in the information processing apparatus according to one or more aspects of the present disclosure.

A software configuration included in the information processing apparatus 110 will be described with reference to the block diagram illustrated in FIG. 2. Of the constituent components illustrated in FIG. 2, although an OS printing support function 202, an OS user interface (UI) module 203, a job queue 205, a USB port monitor 208, and a JobPropertyBag 210 are illustrated as modules of the OS, and a command generation filter 207 and a port monitor extension file 209 are illustrated as modules of the printer driver, respective constituent components may be provided as the modules of any of the OS and the printer driver. Further, in the present exemplary embodiment, the printer driver included in the information processing apparatus 110 is a Version 4 driver (hereinbelow, referred to as "V4 driver") employed in Windows® of Microsoft Corporation. In practice, the CPU 112 executes programs corresponding to the respective constituent components by reading the programs from the external storage device 115 and loading the programs on the RAM 116, so as to realize the processing executed by the respective constituent components. An application 201 is stored in the external storage device 115 and creates print data that includes drawing information including image information or character information of fee-based contents to be printed and print setting information such as a sheet size or a layout. The print setting information returned from the OS UI module 203 is attached to the print data created by the application 201 through the OS printing support function 202, and the print data is temporarily stored in the job queue 205 of a spooler 204 as spool data 206. The spooler 204 includes a job management function, and stores and manages the received spool data 206 until the information processing apparatus 110 recognizes completion of transmission of the print job corresponding to the spool data 206. More specifically, for example, the spooler 204 manages information such as a size, a name, and a transmission order of the print job for each printer, and displays the information on the output device 118 by transmitting the managed information to a status display application. Further, in preparation for occurrence of an error such as a paper jam, the spooler 204 may store the print job itself including print data until the end of the job. In addition, information such as the spool data 206 stored in the job queue 205 can be referred by using a predetermined interface function, for example, via the OS UI module 203 or the application 201. The command generation filter 207 accepts an input of the stored spool data 206 and generates a print job by converting the spool data 206 into a printing command interpretable by the communication apparatus 120. In addition, input processing of the print data to the command generation filter 207 and conversion processing of the print data executed by the command generation filter 207 are controlled by a command generation filter control function of the OS (not illustrated). Thereafter, the command generation filter 207 sequentially outputs the generated print job to the RAM 116 of the information processing apparatus 110 and the external storage device 115. Further, the print job output to the RAM 116 and the external storage device 115 is read by the spooler 204 and transmitted to the communication apparatus 120 via the USB port monitor 208. Furthermore, a vendor of the printer driver can add processing unique to the vendor to the USB port monitor 208 by writing desired print job control processing in the port monitor extension file 209. For example, processing for referring to a storage region managed by the JobPropertyBag 210 provided as an information storage region dedicated to each job may be described in the port monitor extension file 209. With this configuration, the USB port monitor 208 can store optional information in the storage region managed by the JobPropertyBag 210. In addition, data transmission/reception and data notification executed between the USB port monitor 208 and the spooler 204 may be executed with or without interposing the command generation filter 207.

Subsequently, printing control processing executed by the information processing apparatus 110 through the USB port monitor 208 will be described with reference to FIGS. 3 to 5 (consisting of FIGS. 5A and 5B). The printing control processing consists of three types of processing, i.e., printing start processing, print job transmission processing, and printing end processing.

Figure 3:
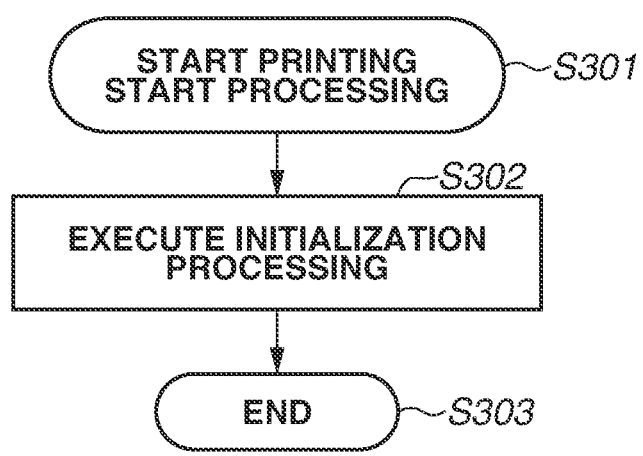
FIG. 3 is a flowchart illustrating printing start processing according to one or more aspects of the present disclosure.

FIG. 3 is a flowchart illustrating the printing start processing executed by the information processing apparatus 110 through the USB port monitor 208 in the present exemplary embodiment. The CPU 112 loads a control program stored in the ROM 113 or the external storage device 115 into the RAM 116 and executes the control program to realize the printing start processing. At this time, the CPU 112 realizes the printing start processing by executing a program corresponding to the USB port monitor 208 according to a program corresponding to the port monitor extension file 209. The printing start processing is started when the user creates print data by using the application 201 and inputs an instruction for printing an image based on the print data through the input device 117.

First, in step S301, by receiving an instruction from the spooler 204, the USB port monitor 208 calls a StartPrintJob function according to a description in the program corresponding to the port monitor extension file 209 and starts the printing start processing. Next, in step S302, the USB port monitor 208 initializes a storage region managed by the JobPropertyBag 210 to secure a storage region necessary to execute subsequent printing control processing, and executes initialization processing of various parameters that are referred to during the printing control processing. Then, in step S303, the USB port monitor 208 ends the printing start processing. Thereafter, the USB port monitor 208 starts the print job transmission processing described below.

Figure 4:
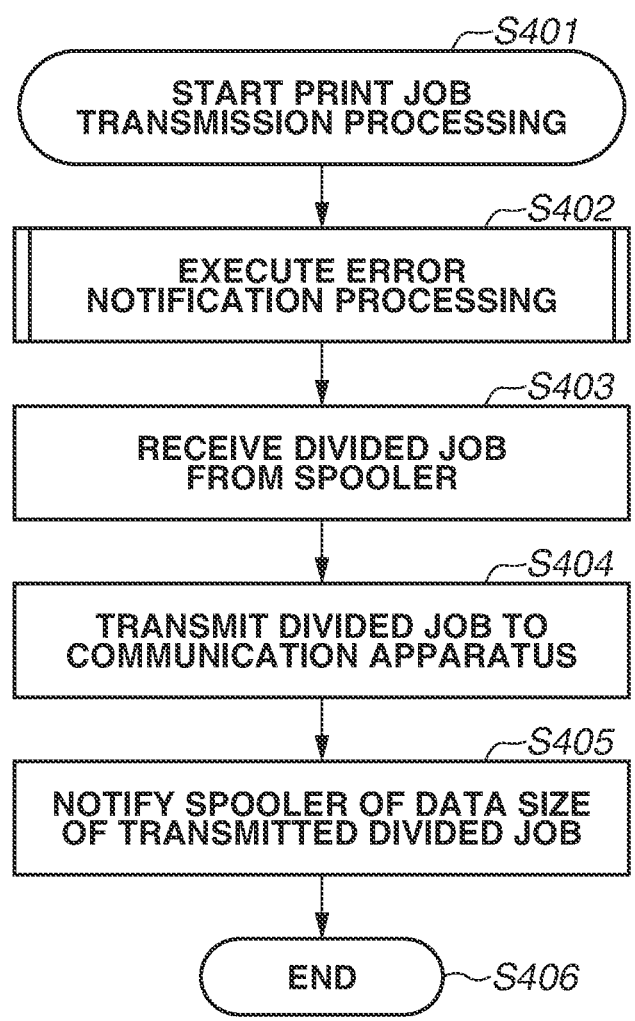
FIG. 4 is a flowchart illustrating print job transmission processing according to one or more aspects of the present disclosure.
Figure 5B:
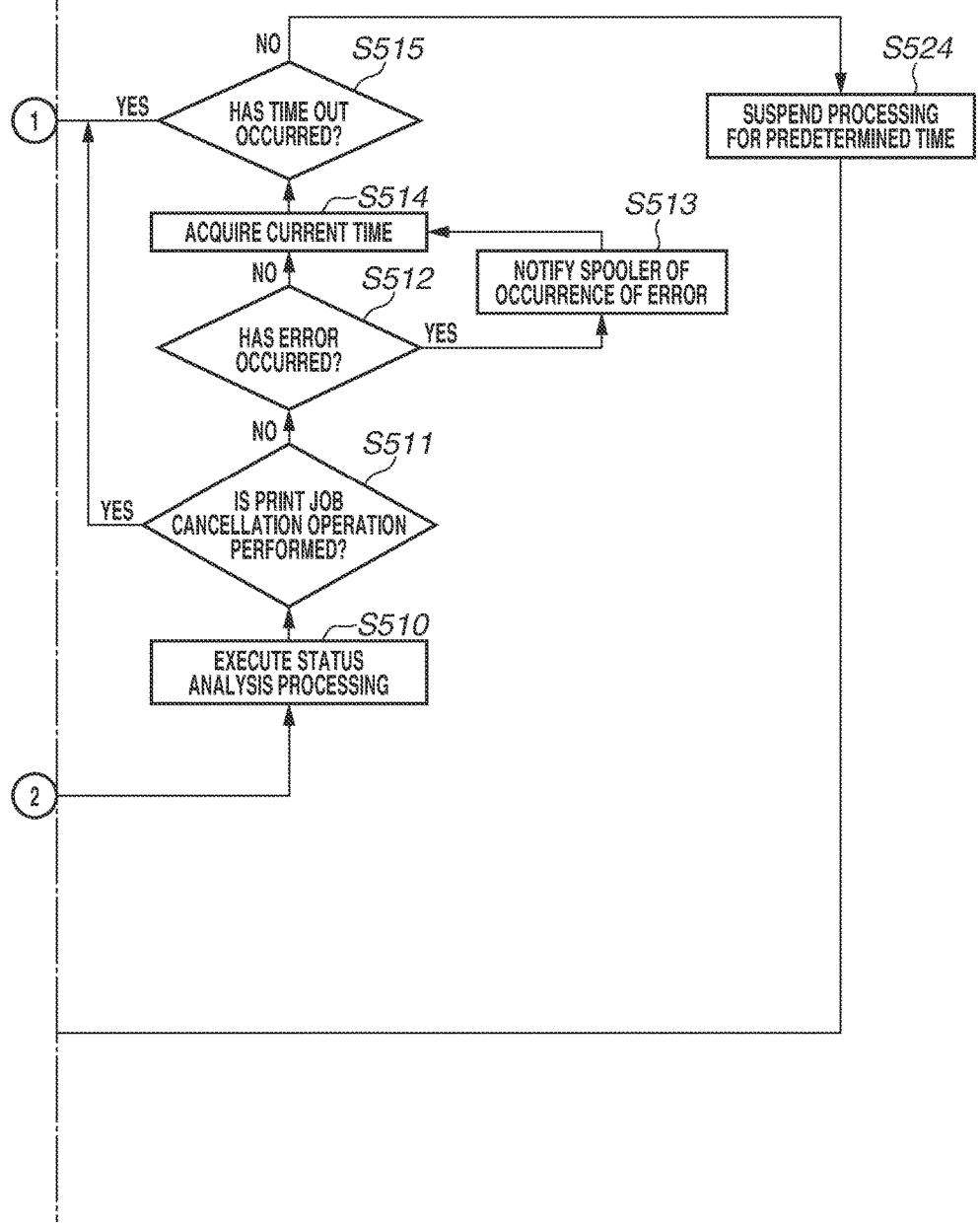
FIG. 5 (consisting of FIGS. 5A and 5B) is a flowchart illustrating printing end processing according to one or more aspects of the present disclosure.

FIG. 4 is a flowchart illustrating the print job transmission processing executed by the information processing apparatus 110 through the USB port monitor 208 in the present exemplary embodiment. The CPU 112 loads a control program stored in the ROM 113 or the external storage device 115 into the RAM 116 and executes the control program to realize the print job transmission processing. Herein, the CPU 112 realizes the print job transmission processing by executing a program corresponding to the USB port monitor 208 according to a program corresponding to the port monitor extension file 209.

First, in step S401, by receiving an instruction from the spooler 204, the USB port monitor 208 calls a writePrintData function according to a description in the program corresponding to the port monitor extension file 209 and starts the print job transmission processing. In addition, the spooler 204 divides the print job output by the command generation filter 207 into print jobs having a predetermined size. Hereinbelow, each of the divided print jobs is referred to as a divided job. Then, the spooler 204 inputs the unentered divided job as an argument of the writePrintData function from among the divided jobs.

Next, in step S402, the USB port monitor 208 executes error notification processing.

The error notification processing executed in step S402 will be described in detail with reference to FIG. 10. In step S1001, the USB port monitor 208 starts the error notification processing. Next, in step S1002, the USB port monitor 208 reads and acquires information from the communication apparatus 120. In addition, for example, the information acquired from the communication apparatus 120 may be information indicating a status of the communication apparatus 120 (i.e., status information) and capability information of the communication apparatus 120. Then, the USB port monitor 208 executes type analysis processing of the information acquired in step S1002.

Next, in step S1003, the USB port monitor 208 refers to the analysis result and determines whether the information acquired in step S1002 is the status information. If the USB port monitor 208 determines that the information acquired in step S1002 is not the status information (NO in step S1003), the processing proceeds to step S1007 to end the error notification processing. On the other hand, if the USB port monitor 208 determines that the information acquired in step S1002 is the status information (YES in step S1003), the processing proceeds to step S1004.

In step S1004, the USB port monitor 208 refers to the acquired status information and executes processing for analyzing the status of the communication apparatus 120 (i.e., status analysis processing). In addition, information about whether an error has occurred in the communication apparatus 120 is stored in the status information.

Then, in step S1005, from the result of the analysis in step S1004, the USB port monitor 208 determines whether an error that prevents the communication apparatus 120 from continuing the printing processing has occurred therein. If the USB port monitor 208 determines that an error has not occurred (NO in step S1005), the processing proceeds to step S1007, to end the error notification processing. On the other hand, if the USB port monitor 208 determines that an error has occurred (YES in step S1005), the processing proceeds to step S1006. In step S1006, the USB port monitor 208 notifies the spooler 204 of an occurrence of the error in the communication apparatus 120. Therefore, the spooler 204 uses an error notification function provided as a standard feature of the OS to notify the user of an occurrence of the error in the communication apparatus 120. More specifically, the spooler 204 causes the output device 118 to display a screen for notifying the user of an occurrence of the error in the communication apparatus 120. At this time, if the OS supports a toast function, the spooler 204 notifies the user of an occurrence of the error in the communication apparatus 120 by displaying a toast (i.e., notification region) on the output device 118 as a pop-up. On the other hand, if the OS does not support the toast function, the spooler 204 notifies the user of the occurrence of the error in the communication apparatus 120 through a screen or a window for displaying a job queue status. The toast function is a function for notifying the user of information, which is introduced in Windows® of Microsoft Corporation as a standard feature of the OS. In addition, the spooler 204 may execute the notification by using a balloon function instead of the toast function.

After ending the error notification processing, in step S403, the USB port monitor 208 receives a divided job input by the spooler 204. Next, in step S404, the USB port monitor 208 transmits the divided job received from the spooler 204 to the communication apparatus 120. Then, in step S405, the USB port monitor 208 notifies the spooler 204 of a data size of the divided job successfully transmitted in step S404. With this notification, the spooler 204 can determine an amount of data that has been transmitted from the print job. Lastly, in step S406, the USB port monitor 208 ends the print job transmission processing. In addition, by receiving an instruction from the spooler 204, the USB port monitor 208 repeatedly executes the print job transmission processing until all of the divided jobs are transmitted. In other words, the USB port monitor 208 repeats the print job transmission processing as many number of times as that of the divided jobs. In a case where one divided job cannot be transmitted through a single piece of print job transmission processing, unsent data is transmitted through the subsequent print job processing. Therefore, the print job processing may be repeated by the number of times greater than the number of divided jobs. Further, the spooler 204 manages whether transmission of all of the divided jobs (i.e., single print job) has been completed. The spooler 204 determines whether a data size of divided jobs successfully transmitted by the USB port monitor 208 up to this time corresponds to the data size of the print job based on the information notified in step S405, and judges whether transmission of the print job is completed. Then, when the USB port monitor 208 completes the transmission of all of the divided jobs (i.e., transmission of a single print job) and the spooler 204 specifies completion of the transmission thereof, the USB port monitor 208 receives a notification from the spooler 204 and executes the following printing end processing.

FIG. 5 is a flowchart illustrating the printing end processing executed by the USB port monitor 208 in the present exemplary embodiment. The CPU 112 loads a control program stored in the ROM 113 or the external storage device 115 and executes the control program to realize the printing end processing. In this case, the CPU 112 realizes the printing end processing by executing a program corresponding to the USB port monitor 208 according to a program corresponding to the port monitor extension file 209.

When the transmission of the print job is completed by repeatedly executing the processing illustrated in FIG. 4, in step S501, the USB port monitor 208 calls an endPrintJob function described in the program corresponding to the port monitor extension file 209 and starts the printing end processing.

Next, in step S502, the USB port monitor 208 refers to initial activation time information stored in the storage region managed by the JobPropertyBag 210. Then, in step S503, the USB port monitor 208 determines whether it is the first time to execute the printing end processing of the print job of a processing target. More specifically, the USB port monitor 208 determines whether time information is stored in the storage region managed by the JobPropertyBag 210. Then, the USB port monitor 208 determines that it is the first time if the time information is not stored, and determines that it is not the first time if the time information is stored. If the USB port monitor 208 determines that it is the first time (YES in step S503), the processing proceeds to step S504. In step S504, the USB port monitor 208 acquires current time information and stores the acquired time information in the storage region managed by the JobPropertyBag 210. On the other hand, if the USB port monitor 208 determines that it is not the first time (NO in step S503), the processing proceeds to step S505.

Next, in step S505, the USB port monitor 208 acquires status information of the print job that is a target of the printing end processing from the spooler 204. In the present exemplary embodiment, by receiving an acquisition request of the status information of the print job from the USB port monitor 208, the spooler 204 notifies the USB port monitor 208 of the status information of the print job corresponding to that request. In addition, the status information of the print job may be, for example, information indicating that the print job is being processed, information indicating that the print job is brought into a cancelled state, or information indicating that processing of the print job is suspended.

Then, in step S506, the USB port monitor 208 determines whether a cancelled state of the print job is detected from the status information of the print job acquired in step S505. In step S506, if the USB port monitor 208 determines that the cancelled state of the print job is detected (YES in step S506), the processing proceeds to step S522.

In a case where the print job is cancelled (i.e., the print job is brought into a cancelled state) by the instruction from the user or the OS, it is preferable that the spooler 204 promptly starts executing processing of the next print job stored in the job queue 205. Therefore, in step S522, the USB port monitor 208 notifies the spooler 204 of completion of the printing end processing, and the printing end processing is ended in step S525. In addition, when completion of printing end processing is notified from the USB port monitor 208, the spooler 204 deletes the print job corresponding to the completed printing end processing stored in the job queue 205. With this processing, the spooler 204 can start processing the next print job by deleting the cancelled print job from the job queue 205.

In step S506, if the USB port monitor 208 determines that the cancelled state of the print job is not detected (NO in step S506), the processing proceeds to step S507. In step S507, the USB port monitor 208 reads and acquires information from the communication apparatus 120. In addition, for example, the information acquired from the communication apparatus 120 may be information indicating completion of the print job processing (i.e., job completion information), information indicating a status of the communication apparatus 120 (i.e., status information), or capability information of the communication apparatus 120. Further, in the present exemplary embodiment, job completion information can be acquired from the communication apparatus 120 if processing of the print job is completed, and status information can be acquired therefrom if the print job is being processed. Furthermore, for example, none of the information can be acquired if communication failure has occurred in a communication path for the communication apparatus 120 or if the communication apparatus 120 is offline.

Then, in step S508, the USB port monitor 208 determines whether the information is acquired from the communication apparatus 120. If the USB port monitor 208 determines that the information is acquired (YES in step S508), the processing proceeds to step S509. In step S509, the USB port monitor 208 executes type analysis processing of the information acquired from the communication apparatus 120.

In step S509, if the USB port monitor 208 analyzes that the information acquired from the communication apparatus 120 is job completion information (JOB COMPLETION INFORMATION in step S509), the processing proceeds to step S522, and the printing end processing is ended.

In step S509, if the USB port monitor 208 analyzes that the information acquired from the communication apparatus 120 is neither the status information of the communication apparatus 120 nor the job completion information (OTHERS in step 3509), the processing proceeds to step S523. In step S523, the USB port monitor 208 notifies the spooler 204 of re-execution (i.e., retry) of the printing end processing. When the spooler 204 is notified of retry, the spooler 204 causes the USB port monitor 208 to execute the printing end processing again. Further, when the spooler 204 is notified of retry, the spooler 204 stores the print job of a target of the printing end processing in the job queue 205 without deleting. Then, the USB port monitor 208 executes the processing from step S501 in a case where the printing end processing is executed again.

Through the analysis in step S509, if the USB port monitor 208 determines that the information acquired from the communication apparatus 120 is the status information of the communication apparatus 120 (STATUS INFORMATION in step S509), the processing proceeds to step S510. In step S510, the USB port monitor 208 refers to the acquired status information and executes processing for analyzing the status of the communication apparatus 120 (i.e., status analysis processing). Further, information indicating whether printing processing is canceled because of the operation with respect to the communication apparatus 120 (e.g., a press of a printing cancellation button), information indicating whether an error has occurred in the communication apparatus 120, and/or information indicating whether the print jot is being processed are stored in the status information. Hereinbelow, the information indicating printing processing is cancelled and the information indicating an error has occurred in the communication apparatus 120 are referred to as printing cancellation information. In addition, another type of information may be included as the status information or the printing cancellation information, and another determination based on another type of information may be executed in the below-described printing cancellation determination.

Then, in step S511, the USB port monitor 208 determines whether the printing processing is cancelled based on a result of the status analysis executed in step S510. Cancellation of the printing processing occurs when the user performs an operation (e.g., a press of a printing cancellation button) with respect to the communication apparatus 120. When the USB port monitor 208 determines that the printing processing is cancelled (YES in step S511), the processing proceeds to step S522, and the printing end processing is ended. As described above, the printing end processing is ended in order to allow the spooler 204 to promptly start printing processing of the next print job stored in the job queue 205.

In step S511, if the USB port monitor 208 determines that the printing processing is not cancelled (NO in step S511), the processing proceeds to step S512. In step S512, the USB port monitor 208 determines whether an error that prohibits the communication apparatus 120 from continuing the printing processing has occurred therein. If the error has occurred in the communication apparatus 120 (YES in step S512), the processing proceeds to step S513. In step S513, the USB port monitor 208 notifies the spooler 204 of occurrence of the error in the communication apparatus 120. Then, the spooler 204 uses the error notification function provided as a standard feature of the OS to notify the user of the occurrence of the error in the communication apparatus 120. More specifically, the spooler 204 causes the output device 118 to display a screen for notifying the user of the occurrence of the error in the communication apparatus 120. At this time, if the OS supports the toast (information notification window) function, the spooler 204 notifies the user of the occurrence of the error in the communication apparatus 120 by displaying a toast on the output device 118 as a pop-up. On the other hand, if the OS does not support the toast function, the spooler 204 notifies the user of the occurrence of the error in the communication apparatus 120 through a screen or a window for displaying a job queue status to the user.

If the USB port monitor 208 determines that an error has not occurred in the communication apparatus 120 (NO in step S512) in step S512 or executes the processing in step S513, the processing proceeds to step S514. In step S514, the USB port monitor 208 acquires current time information.

In step S515, the USB port monitor 208 compares the current time acquired in step S514 with the initial activation time of the printing end processing stored in the JobPropertyBag 210 in step S504, and determines whether there is a difference equal to or greater than a predetermined amount of time (i.e., whether timeout has occurred). If the timeout has occurred (YES in step S515), the processing proceeds to step S522, and the USB port monitor 208 ends the printing end processing. With this operation, the next job stored in the job queue 205 can be started even if the printing cancellation information is not included in the acquired status information, and a situation in which job end information is not acquired has continued for a long period of time due to unexpected reasons. On the other hand, if the timeout has not occurred (NO in step S515), the processing proceeds to step S524. In step S524, the USB port monitor 208 suspends the processing for a predetermined period of time. Then, in step S523, the USB port monitor 208 notifies the spooler 204 of retry of the printing end processing. When the spooler 204 receives a retry notification of printing end processing, the spooler 204 instantly instructs the USB port monitor 208 to execute printing end processing. Therefore, by suspending the processing of the USB port monitor 208 for a predetermined period of time in step S524, it is possible to prevent generation of an excessive load caused by repetitive access to the communication apparatus 120 at a minimal interval in step S507.

Next, in step S508, if the USB port monitor 208 has failed in acquisition of the information from the communication apparatus 120 (NO in step S508), the processing proceeds to step S516. In step S516, the USB port monitor 208 transmits a command (request command) for requesting the status information to the communication apparatus 120. This request command is transmitted in order to detect whether the cause of the failure in acquisition of the information in step S507 is an incommunicable state of the communication apparatus 120. As it is sufficient if the USB port monitor 208 can detect whether information can be transmitted to the communication apparatus 120, the information to be transmitted is not limited to the request command of the status information.

Then, in step S517, the USB port monitor 208 determines whether the request command transmission processing in step S516 has succeeded. More specifically, the USB port monitor 208 determines whether information about a size of data succeeded in transmission can be acquired. If it is determined that the information about the data size can be acquired, the USB port monitor 208 determines that the request command transmission processing has succeeded, and if it is determined that the information about the data size cannot be acquired, the USB port monitor 208 determines that the request command transmission processing has failed. In addition, if the request command transmission processing has succeeded, the USB port monitor 208 can read and acquire the status information from the communication apparatus 120 when the processing in step S507 is executed next time.

If the USB port monitor 208 determines that the request command transmission processing has failed (NO in step S517), the processing proceeds to step S519. In step S519, the USB port monitor 208 updates the information about a total number of failures in request command transmission processing. In addition, the information about the total number of failures in request command transmission processing is stored in the JobPropertyBag 210. Then, in step S520, the USB port monitor 208 determines whether the total number of failures in request command transmission processing exceeds a specified number of times. If the USB port monitor 208 determines that the total number of failures in request command transmission processing does not exceed the specified number of times (NO in step S520), the processing proceeds to step S523. In step S523, the USB port monitor 208 notifies the spooler 204 of retry of the printing end processing. On the other hand, if the USB port monitor 208 determines that the total number of failures in request command transmission processing exceeds the specified number of times (YES in step S520), the processing proceeds to step S521. In step S521, the USB port monitor 208 notifies the spooler 204 of an incommunicable state of the communication apparatus 120. Upon reception of the notification, the spooler 204 uses the error notification function provided as a standard feature of the OS to notify the user of the incommunicable state of the communication apparatus 120. More specifically, the spooler 204 causes the output device 118 to display a screen that notifies the user of the incommunicable state of the communication apparatus 120. At this time, if the OS supports the toast function, the spooler 204 notifies the user of the occurrence of the error in the communication apparatus 120 by displaying a toast on the output device 118 as a pop-up. On the other hand, if the OS does not support the toast function, the spooler 204 notifies the user of the occurrence of the error in the communication apparatus 120 through a screen or a window for displaying a job queue status to the user.

Then, the processing proceeds to step S522, and the USB port monitor 208 ends the printing end processing.

If the USB port monitor 208 determines that the request command transmission processing has succeeded (YES in step S517), the processing proceeds to step S518. In step S518, the USB port monitor 208 updates the total number of failures in request command transmission processing to zero. Then, the processing proceeds to step 3523 and notifies the spooler 204 of the retry of the printing end processing. Through the above-described processing, the USB port monitor 208 can appropriately complete processing of the job even if the communication apparatus 120 has shifted to the offline state (incommunicable state) when the printing end processing is being executed. Therefore, when the communication apparatus 120 returns to the online state (communicable state) again, processing of the next print job stored in the job queue 205 can be started promptly.

As described above, in the present exemplary embodiment, the spooler 204 does not delete the print job from the job queue 205 until the job completion information can be acquired in the printing end processing. Further, the USB port monitor 208 continuously acquires the information about the print job from the communication apparatus 120 until the job completion information can be acquired in the printing end processing. Therefore, the spooler 204 can grasp the status of the print job until the processing therefor is completed by synchronizing the timing of deleting the print job from the job queue 205 with the timing at which the communication apparatus 120 completes the printing processing.

Further, conventionally, the USB port monitor 208 has realized job holding processing by repeatedly executing the print job transmission processing until the communication apparatus 120 completes the printing processing. In order to repeats the print job transmission processing, incorrect information has to be transmitted to the spooler 204 as a data size of the divided jobs succeeded in transmission when the divided job to be transmitted is the last divided job. Therefore, in the conventional embodiment, processing for analyzing whether the divided job to be transmitted is the last divided job (transmission data analysis processing) has been executed in order to determine a timing of transmitting the incorrect transmission data size. On the other hand, in the present exemplary embodiment, until the communication apparatus 120 completes the printing processing, the USB port monitor 208 repeatedly executes the printing end processing (i.e., processing after the print job transmission processing) instead of the print job transmission processing to realize the job holding processing. In order to repeat the printing end processing, the USB port monitor 208 does not have to transmit the incorrect transmission data size to the spooler 204 when the divided job to be transmitted is the last divided job. Therefore, in the present exemplary embodiment, the job holding processing can be realized without executing the transmission data analysis processing, and thus a load with respect to the job holding processing can be reduced. Thus, the time taken to complete transmission of the print job can be shortened, and a transmission throughput of the print job can be improved.

In addition, the V4 driver has a function for using the toast function provided by the OS. Because a status of the communication apparatus 120 or a processing status of the job can be effectively notified to the user through the toast function, it is preferable that the status of the job be monitored through the job holding processing in order to efficiently use the toast function. However, because of the difference in programming language, a printer driver such as the V4 driver which does not include a language monitor as a constituent component has a processing speed lower than that of a printer driver such as the Version 3 driver which includes a language monitor as a constituent element. The Version 3 driver is a driver earlier than the V4 driver employed in Windows® of Microsoft Corporation. Further, because many resources are necessary for the transmission data analysis processing executed in the conventional job holding processing, it will take a lot of time to execute the transmission data analysis processing if the job holding processing is executed by the V4 driver as it has been in the conventional manner. As a result, for example, there arises a problem in which the printing speed will be lowered. In the present exemplary embodiment, because the job holding processing can be realized without executing the analysis processing of the print data, even in a configuration using a driver having the low processing speed such as the V4 driver, the job holding processing can be realized while suppressing lowering of the printing speed. In other words, the present exemplary embodiment is particularly effective for the configuration using a driver having the low processing speed such as the V4 driver.

In the first exemplary embodiment, description has been given of an exemplary embodiment in which the job holding processing is realized by repeatedly executing the printing end processing until the job end information is acquired from the communication apparatus 120. However, depending on the type of the OS installed in the communication apparatus 120 or the information processing apparatus 110, there is a case where the job end information cannot be acquired from the communication apparatus 120. Therefore, in a second exemplary embodiment, description will be given of an exemplary embodiment in which the job holding processing is realized without acquiring the job end information. In the present exemplary embodiment, the information processing apparatus 110 attaches unique identification information to each of the print jobs and transmits the print jobs to the communication apparatus 120. Further, the communication apparatus 120 returns a list of the identification information attached to the print job that is being processed and the identification information attached to the print job the processing of which is completed to the information processing apparatus 110 according to the request. In the present exemplary embodiment, while a processing-target job is continuously stored until completion of the processing is detected like in the first exemplary embodiment, the information processing apparatus 110 detects completion of the processing based on the identification information returned from the communication apparatus 120. In the present exemplary embodiment, the problem is solved by realizing the job holding processing as described above. In addition, in the present exemplary embodiment, the configuration is similar to that of the first exemplary embodiment unless otherwise specified.

Figure 6:
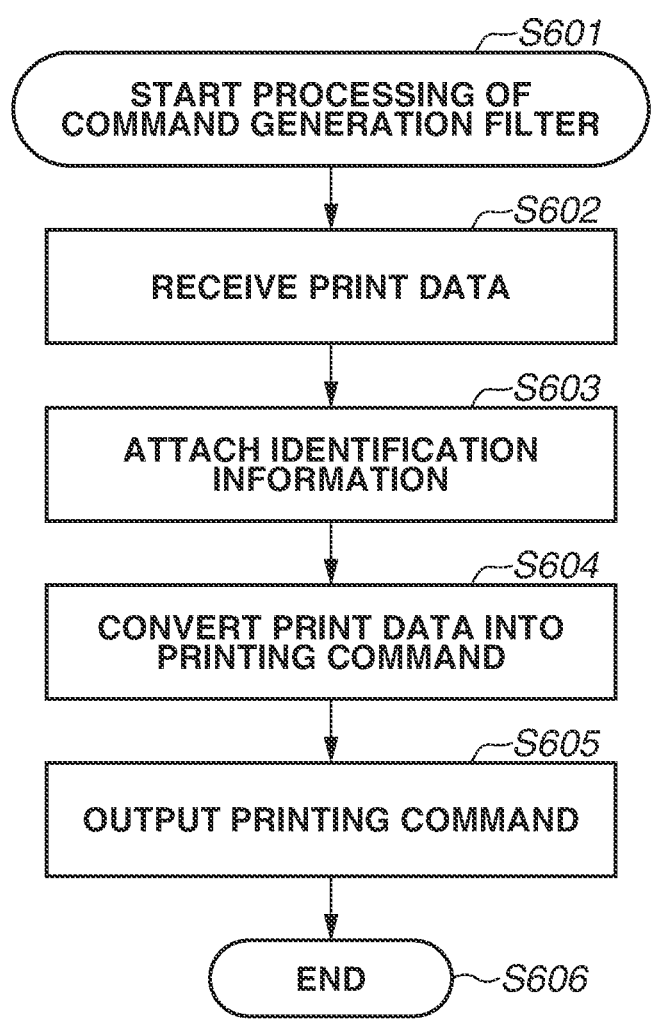
FIG. 6 is a flowchart illustrating print job generation processing.

FIG. 6 is a flowchart illustrating print job generation processing executed by the command generation filter 207 in the present exemplary embodiment. The CPU 112 loads a control program stored in the ROM 113 or the external storage device 115 and executes the control program to realize the printing start processing. In the present exemplary embodiment, the CPU 112 realizes the print job generation processing by executing a program corresponding to the command generation filter 207.

First, in step S601, the command generation filter 207 is activated by a command generation filter control function provided by the OS to start processing. Next, in step S602, the command generation filter 207 receives print data created by the application 201 through the command generation filter control function of the OS. Next, in step S603, the command generation filter 207 attaches the identification information for uniquely identifying the print data to the received print data. FIG. 7 is a diagram illustrating an example of the identification information attached to the print data. Although the identification information in FIG. 7 is expressed by numerical values, hyphenation, and alphabets, the configuration of the identification information is not limited to this example. Next, in step S604, according to the print setting information attached to the received print data, the command generation filter 207 converts the print data into a printing command readable by the communication apparatus 120, to generate a print job including the identification information. In addition, prior to the processing in step S604, the command generation filter 207 may additionally execute page organization processing for changing a page order of the print data or reorganizing a plurality of pages into one page according to the print setting information attached to the received print data. Further, the identification information may be attached after the command generation filter 207 executes conversion of print data to generate the print job.

Figure 8:
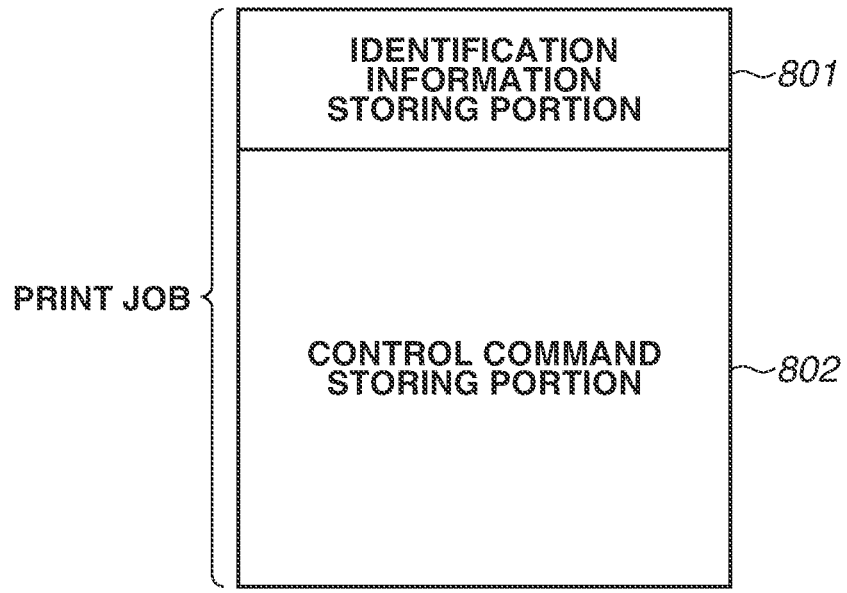
FIG. 8 is a diagram schematically illustrating a print job generated by a command generation filter according to one or more aspects of the present disclosure.

FIG. 8 is a diagram schematically illustrating a print job generated by the command generation filter 207. The print job generated by the command generation filter 207 includes an identification information storing portion 801 and a control command storing portion 802. The identification information attached in step S603 is stored in the identification information storing portion 801. The control command storing portion 802 stores a command for controlling the communication apparatus 120 to print an image based on the print data, which is acquired through the predetermined conversion executed on the print data received by the command generation filter 207. In other words, the communication apparatus 120 can print an image by executing the operation based on the command stored in the control command storing portion 802.

Then, in step S605, the command generation filter 207 outputs the print job including the identification information to a storage region such as the external storage device 115 or the RAM 116, and ends the processing in step S606. Then, the print job output by the command generation filter 207 is transmitted to the communication apparatus 120 through the print job transmission processing executed by the spooler 204.

FIG. 9 is a flowchart illustrating print job transmission processing executed by the USB port monitor 208 in the present exemplary embodiment.

First, in step S901, by receiving an instruction from the spooler 204, the USB port monitor 208 calls a writePrintData function according to a description in the program corresponding to the port monitor extension file 209 and starts the print job transmission processing. In addition, similar to the first exemplary embodiment, the spooler 204 divides the print job output by the command generation filter 207 into print jobs having a predetermined size. Then, the spooler 204 inputs the unentered divided job as an argument of the writePrintData function from among the divided jobs.

Next, in step S902, the USB port monitor 208 executes error notification processing. In addition, the error notification processing is similar to the processing described in the first exemplary embodiment, and thus description thereof will be omitted.

After ending the error notification processing, in step S903, the USB port monitor 208 receives a divided job from the spooler 204. In the present exemplary embodiment, as described above, the identification information is included in the print job, and the print job is divided by the spooler 204. In this case, because the spooler 204 divides the print job without distinguishing the identification information from the print job, the print job may be divided into a divided job that does not include the identification information or a divided job that includes only a part of the identification information.

In step S904, the USB port monitor 208 determines whether identification information has already been detected in the below-described processing in step S906 in the print job transmission processing of the processing-target print job. More specifically, the USB port monitor 208 determines whether information indicating detection of the identification information is stored in the storage region managed by the JopPropertyBag 210. Naturally, in the processing in step S904 that is executed first time in the print job transmission processing of the print job of a processing target, the information indicating detection of the identification information is not stored in the storage region managed by the JopPropertyBag 210. Therefore, the USB port monitor 208 determines that the identification information has not been detected. Further, the information indicating detection of the identification information may be the identification information itself, or may be a flag indicating detection of the identification information.

In the determination performed in step S904, if the USB port monitor 208 determines that the identification information has been detected already (YES in step S904), the processing proceeds to step S908. In step S908, the USB port monitor 208 determines whether the unsent divided job is stored in the storage region managed by the JobPropertyBag 210. If the unsent divided job is stored in the storage region managed by the JobPropertyBag 210 (YES in step S908), the processing proceeds to step S909. In step S909, the USB port monitor 208 transmits the unsent divided job to the communication apparatus 120. If the unsent divided job is not stored in the storage region managed by the JobPropertyBag 210 (NO in step S908), the processing proceeds to step S910. In step S910, the USB port monitor 208 transmits the divided job received from the spooler 204 in step S903 to the communication apparatus 120. Then, in step S911, the USB port monitor 208 notifies the spooler 204 of size information of the divided job transmitted successfully. Through the processing in step S911, the spooler 204 can determine an amount of data that has been transmitted from the print job. Then, the USB port monitor 208 ends the processing in step S914.

On the other hand, in the determination performed in step S904, if the USB port monitor 208 determines that the identification information has not been detected (NO in step S904), the processing proceeds to step S905.

In step S905, the USB port monitor 208 combines the divided job stored in the storage region managed by the JobPropertyBag 210 and the divided job received from the spooler 204 in step S903. This is because a divided job that includes only a part of the identification information is stored in the storage region managed by the JopPropertyBag 210 in a case where a divided job that includes only a part of the identification information is received in the previous print job transmission processing. In step S905, the USB port monitor 208 can restore a plurality of pieces of identification information into one complete piece of identification information by combining the previously-received divided job and the divided job received this time. Naturally, in the processing performed in step S905 that is executed first time in the print job transmission processing of the print job as a processing target, the divided job is not stored in the storage region managed by the JobPropertyBag 210. Therefore, in the processing in step S905 that is executed first time in the print job transmission processing of the print job of a processing target, the USB port monitor 208 advances the processing to the subsequent processing without combining the divided jobs.

Then, in step S906, the USB port monitor 208 determines whether identification information is included in the divided job combined in step S905 or received in step S903. If the USB port monitor 208 determines that the identification information is included (i.e., identification information is restored) (YES in step S906), the processing proceeds to step S907. In step S907, the USB port monitor 208 stores the identification information included in the divided job and the information indicating detection of the identification information in the storage region managed by the JobPropertyBag 210.

Then, the USB port monitor 208 executes the processing in step S908 and the subsequent steps.

In step S906, if the USB port monitor 208 determines that the identification information is not included (NO in step S906), the processing proceeds to step S912. In step S912, the USB port monitor 208 stores the divided job combined in step S905 or received in step S903 in the storage region managed by the JobPropertyBag 210. Then, in step S913, the USB port monitor 208 notifies the spooler 204 of a size of the divided job stored in the storage region managed by the JobPropertyBag 210. Then, in step S914, the USB port monitor 208 ends the print job transmission processing. In addition, by receiving an instruction from the spooler 204, the USB port monitor 208 repeatedly executes the print job transmission processing until all of the divided jobs are transmitted. In other words, the USB port monitor 208 repeats the print job transmission processing by the number of times equal to the number of the divided jobs. Further, the spooler 204 manages whether transmission of all of the divided jobs has been completed. When transmission of all of the divided jobs (i.e., single print job) is completed, the USB port monitor 208 executes the following printing end processing by receiving a notification from the spooler 204.

FIG. 11 (consisting of FIGS. 11A and 11B) is a flowchart illustrating the printing end processing executed by the USB port monitor 208 in the present exemplary embodiment. The processing in steps S1101 to S1106 and steps S1115 to S1128 is similar to the processing in steps S501 to S506 and steps S511 to S524 described in the first exemplary embodiment, and thus description thereof will be omitted.

In step S1107, the USB port monitor 208 reads and acquires information from the communication apparatus 120. In addition, the information acquired from the communication apparatus 120 may be, for example, information indicating a status of the communication apparatus 120 (i.e., status information) or capability information of the communication apparatus 120. Further, in the present exemplary embodiment, the status information can be acquired from the communication apparatus 120 if the processing of the print job is completed or being processed. Further, none of the above information cannot be acquired if, for example, communication failure has occurred in a communication path for the communication apparatus 120 or if the communication apparatus 120 is offline.

Then, in step S1108, the USB port monitor 208 determines whether the information is acquired from the communication apparatus 120. If the USB port monitor 208 determines that the information is acquired (YES in step 31108), the processing proceeds to step S1109. In step S1109, the USB port monitor 208 executes type analysis processing of the information acquired from the communication apparatus 120.

Through the type analysis processing in step S1109, if the USB port monitor 208 analyzes that the information acquired from the communication apparatus 120 is not the status information of the communication apparatus 120 (NO in step S1109), the processing proceeds to step S1127. In step S1127, the USB port monitor 208 notifies the spooler 204 of re-execution (i.e., retry) of the printing end processing. When the spooler 204 is notified of the retry, the spooler 204 causes the USB port monitor 208 to execute the printing end processing again. Further, when the spooler 204 is notified of the retry, the spooler 204 stores the print job of a target of the printing end processing in the job queue 205 without deleting. Then, the USB port monitor 208 executes the processing from step S1101 in a case where the printing end processing is executed again.

Through the type analysis processing in step S1109, if the USB port monitor 208 analyzes that the information acquired from the communication apparatus 120 is the status information of the communication apparatus 120 (YES in step S1109), the processing proceeds to step S1110. In step S1110, the USB port monitor 208 refers to the acquired status information and executes processing for analyzing the status of the communication apparatus 120 (i.e., status analysis processing). In step S1110, the USB port monitor 208 analyzes the status information and acquires the identification information attached to the print job that is being processed by the communication apparatus 120. Further, for example, in a case where the processing of the print job has not been started or the processing thereof has been ended already, the communication apparatus 120 may not be executing the processing of the print job. In this case, the USB port monitor 208 cannot acquire the identification information because the identification information is not included in the status information.

Then, in step S1111, the USB port monitor 208 determines whether the identification information stored in the storage region managed by the JobPropertyBag 210 in the print job transmission processing is included in the acquired status information. More specifically, the USB port monitor 208 compares the identification information stored at the time of the print job transmission processing with the identification information acquired in step S1110 to determine whether two pieces of identification information coincide with each other. If the print job transmitted by the USB port monitor 208 in the print job transmission processing is being executed by the communication apparatus 120, the two pieces of identification information coincide with each another. If the USB port monitor 208 determines that the two pieces of identification information coincide with each another (YES in step S1111), the processing proceeds to step S1115. On the other hand, if the communication apparatus 120 has completed the processing of the print job transmitted by the USB port monitor 208 in the print job transmission processing while being processing a print job transmitted from another information processing apparatus, two pieces of the identification information do not coincide with each other. If the USB port monitor 208 determines that the two pieces of identification information do not coincide with each other (NO in step S1111), the processing proceeds to step S1112. In step S1112, the USB port monitor 208 transmits a request command for acquiring print job history information to the communication apparatus 120. In addition, as described above, there is a case where none of the pieces of identification information is included in the acquired status information. In this case also, the processing proceeds to step S1112, and the USB port monitor 208 transmits a request command for acquiring the print job history information to the communication apparatus 120.

After the processing in step S1112, in step S1113, the USB port monitor 208 reads and acquires the print job history information from the communication apparatus 120. FIG. 12 is a diagram illustrating an example of the print job history information. In the print job history information, in what status the processing of each print job executed by the communication apparatus 120 is ended is described as a list together with the identification information attached to the print job.

Then, in step S1114, the USB port monitor 208 determines whether the print job corresponding to the identification information stored in the storage region managed by the JobPropertyBag 210 is included in the acquired history information. In a case where processing of the print job corresponding to the identification information stored in the storage region managed by the JobPropertyBag 210 has been ended already, information about that print job is included in the history information. Therefore, if the USB port monitor 208 determines that the print job corresponding to the identification information stored in the storage region managed by the JobPropertyBag 210 is included in the acquired history information (YES in step S1114), the processing proceeds to step S1126. Then, in step S1126, the USB port monitor 208 notifies the spooler 204 of completion of the printing end processing. Thereafter, in step S1128, the USB port monitor 208 determines to end the printing end processing. On the other hand, if processing of the print job corresponding to the identification information stored in the storage region managed by the JobPropertyBag 210 has not been started by the communication apparatus 120 yet, information about that print job is not included in the history information. If the print job corresponding to the identification information stored in the storage region managed by the JobPropertyBag 210 is not included in the acquired history information (NO in step S1114), the processing proceeds to step S1115. In step S1115, the USB port monitor 208 executes cancellation determination processing of the printing processing. Further, for example, information such as a job name or transmission date/time of the job may be included in the print job history information, and the USB port monitor 208 may determine whether the print job transmitted in the print job transmission processing is included in the print job history information based on that information.

As described above, in the present exemplary embodiment, the information processing apparatus 110 acquires identification information attached to a print job that is being processed by the communication apparatus 120, and determines whether the print job transmitted by the information processing apparatus 110 is completed based on the analysis result of the acquired identification information or based on whether the identification information is acquired. With this configuration, even if the job end information cannot be acquired from the communication apparatus 120, it is possible to determine whether the print job transmitted by the information processing apparatus 110 is completed. In other words, even if the job end information cannot be acquired from the communication apparatus 120, it is possible to realize a method for efficiently controlling the print job without executing the transmission data analysis processing.

The present disclosure can also be achieved in such a manner that a storage medium storing a program code of software for realizing the functions of the above-described exemplary embodiments is supplied to a system or an apparatus, and a CPU of the system or the apparatus reads and executes the program code stored in the storage medium. In this case, the program code itself read from the storage medium realizes the functions of the above-described exemplary embodiments, and thus the storage medium storing that program code constitutes the present disclosure.

For example, a flexible disk, a hard disk, a solid state drive (SSD), an optical disk, a magneto-optical disk, a compact disc read only memory (CD-ROM), a compact disc recordable (CD-R), a magnetic tape, a non-volatile memory card, a ROM, or a digital versatile disc (DVD) can be used as a storage medium for supplying the program code.

Further, the functions of the above-described exemplary embodiments are realized by the computer by executing the read program code. In addition, it is obvious that the present disclosure also includes an exemplary embodiment in which an OS operating on the computer executes all or a part of actual processing based on the instruction provided by the program code to realize the functions of the above-described exemplary embodiments through the processing.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2016-038346, filed Feb. 29, 2016, which is hereby incorporated by reference herein in its entirety.

What is claimed is:

1. A control method for controlling an information processing apparatus including a printer driver for creating a job based on a printing command received from an application, a spooler for managing a job queue that stores the job and a port monitor, wherein the printer driver includes a port monitor extension file for adding processing to be executed by the port monitor, and wherein the port monitor has a function of transmitting data corresponding to the job to a communication apparatus and a function of acquiring information about the job from the communication apparatus, the control method comprising:
   causing the port monitor to execute transmission processing of transmitting the data corresponding to the job to the communication apparatus;
   causing the port monitor to execute end processing for ending control of the job by the port monitor by calling a predetermined function in accordance with the port monitor extension file, the end processing including processing of acquiring the information about the job from the communication apparatus, after completion of the transmission processing;
   causing the port monitor to execute retry notification for a retry of the end processing to the spooler without completing the end processing in a case where ending of processing of the job by the communication apparatus is not identified on a basis of the information about the job acquired in the end processing; and
   causing the port monitor to execute deletion notification for deleting the job from the job queue to the spooler with completing the end processing in a case where ending of processing of the job by the communication apparatus is identified on a basis of the information about the job acquired in the end processing;
   wherein the spooler causes the port monitor to retry the end processing in a case where the retry notification is executed to the spooler, and the job is deleted from the job queue in a case where the deletion notification is executed to the spooler.

2. The control method according to claim 1, further comprising:
   causing the port monitor to determine whether processing of the job is completed by the communication apparatus based on the information about the job acquired in the end processing,
   wherein the deletion notification is executed to the spooler with completing the end processing in a case where it is determined that processing of the job is completed by the communication apparatus, and the retry notification is executed to the spooler without completing the end processing in a case where it is determined that the processing of the job is not completed by the communication apparatus.

3. The control method according to claim 1, further comprising:
   causing the port monitor to determine whether processing of the job is cancelled by a user on a basis of the information about the job acquired in the end processing;
   wherein the deletion notification is executed to the spooler in a case where it is determined that the processing of the job is cancelled by a user.

4. The control method according to claim 1, further comprising:
   causing the port monitor to determine whether a job that is being processed by the communication apparatus is a job corresponding to the transmitted data on a basis of the information about the job acquired in the end processing; and
   causing the port monitor to acquire a list of information about jobs which the communication apparatus ends processing from the communication apparatus in a case where it is determined that a job that is being processed by the communication apparatus is not a job corresponding to the transmitted data,
   wherein the deletion notification is executed to the spooler in a case where information about the job corresponding to the transmitted data is included in acquired the list, and the deletion notification is not executed to the spooler in a case where information about the job corresponding to the transmitted data is not included in the acquired list.

5. The control method according to claim 4, further comprising:
   causing the port monitor to attach identification information to a job corresponding to the transmitted data,
   wherein it is determined whether a job that is being processed by the communication apparatus is a job corresponding to the transmitted data by determining whether the attached identification information is included in the information about the job acquired in the end processing.

6. The control method according to claim 5,
   wherein a list of identification information attached to jobs which the communication apparatus ends processing is acquired from the communication apparatus,
   wherein the deletion notification is executed to the spooler in a case where identification information attached to a job corresponding to the transmitted data is included in the acquired list, and the deletion notification is not executed to the spooler in a case where identification information attached to a job corresponding to the transmitted data is not included in the acquired list.

7. The control method according to claim 1, further comprising:

causing the port monitor to control a display unit included in the information processing apparatus to display a status of a job corresponding to the transmitted data or a status of the communication apparatus based on the information about the job acquired in the end processing.

8. The control method according to claim 7, further comprising:
causing the port monitor to determine whether an error has occurred in the communication apparatus based on the information about the job acquired in the end processing,
wherein a screen for notifying a user of occurrence of an error in the communication apparatus is displayed on the display unit in a case where it is determined that an error has occurred in the communication apparatus.

9. The control method according to claim 8, wherein a notification region for notifying a user of a status of a job corresponding to the transmitted data or a status of the communication apparatus is displayed on the display unit as a pop-up.

10. The control method according to claim 1, wherein a job corresponding to the transmitted data is a print job for causing the communication apparatus to execute printing or a scan job for causing the communication apparatus to execute scanning, and
wherein the processing of the job executed by the communication apparatus is either print processing or scan processing.

11. The control method according to claim 1, wherein the printer driver is a Version 4 driver.

12. The control method according to claim 1 further comprising:
causing the port monitor to notify the spooler of a data size of data transmission of which is completed from among pieces of data corresponding to the job,
wherein the spooler specifies that transmission of all of the pieces of data corresponding to the job is completed in the transmitting based on the notification of data size.

13. The control method according to claim 1, wherein the printer driver does not include a language monitor.

14. The control method according to claim 1, wherein data corresponding to the job is transmitted to the communication apparatus without analyzing whether the data of a transmission target is data to be transmitted last from among the plurality of pieces of data corresponding to the job.

15. A non-transitory computer-readable recording medium that stores a program for creating a job based on a printing command received from an application and for causing a computer of an information processing apparatus including a spooler for managing a job queue that stores the job, a port monitor, and a port monitor extension file for adding processing to be executed by the port monitor, wherein the port monitor has a function of transmitting data corresponding to the job to a communication apparatus and a function of acquiring information about the job from the communication apparatus, to perform a method, the method comprising:
causing the port monitor to execute transmission processing of transmitting the data corresponding to the job to the communication apparatus;
causing the port monitor to execute end processing for ending control of the job by the port monitor by calling a predetermined function in accordance with the port monitor extension file, the end processing including processing of acquiring the information about the job from the communication apparatus, after completion of the transmission processing;
causing the port monitor to execute retry notification for a retry of the end processing to the spooler without completing the end processing in a case where ending of processing of the job by the communication apparatus is not identified on a basis of the information about the job acquired in the end processing;
causing the port monitor to execute deletion notification for deleting the job from the job queue to the spooler with completing the end processing in a case where ending of processing of the job by the communication apparatus is identified on a basis of the information about the job acquired in the end processing;
wherein the spooler causes the port monitor to retry the end processing in a case where the retry notification is executed to the spooler, and the job is deleted from the job queue in a case where the deletion notification is executed to the spooler.

16. The recording medium according to claim 15, wherein the program is a Version 4 driver.

17. The recording medium according to claim 15, wherein the data corresponding to the job is transmitted to the communication apparatus without analyzing whether the data of a transmission target is data to be transmitted last from among the plurality of pieces of data corresponding to the job.

* * * * *